United States Patent

Butine et al.

[11] 3,858,525
[45] Jan. 7, 1975

[54] TRACTION MOTOR HOUSING SUSPENSION

[75] Inventors: John Donovan Butine; Martin Jay Hapeman, both of Erie, Pa.

[73] Assignee: General Electric Company, Erie, Pa.

[22] Filed: Nov. 3, 1972

[21] Appl. No.: 303,307

[52] U.S. Cl. ............... 105/136, 105/131, 105/133, 105/140
[51] Int. Cl. ........ B60k 1/00, B61c 3/00, B61c 9/48
[58] Field of Search ........ 105/130, 131, 132, 132.1, 105/133, 136, 138, 140

[56] References Cited
UNITED STATES PATENTS

| | | | |
|---|---|---|---|
| 1,386,589 | 8/1921 | Murray et al. | 105/131 |
| 1,840,351 | 1/1932 | Douden | 274/41.6 R X |
| 2,501,307 | 3/1950 | Binney | 105/136 |
| 2,699,732 | 1/1955 | Schellentrager | 105/140 X |
| 2,976,819 | 3/1961 | Rossell | 105/138 |
| 3,014,433 | 12/1961 | Durand | 105/131 X |
| 3,135,224 | 6/1964 | McLean | 105/136 |
| 3,152,558 | 10/1964 | Mueller | 105/133 |
| 3,443,527 | 5/1969 | Kennedy | 105/136 |
| 3,468,389 | 9/1969 | Nelson | 105/136 X |
| 3,516,365 | 6/1970 | Lich | 105/133 |

*Primary Examiner*—Lloyd L. King
*Assistant Examiner*—Howard Beltran
*Attorney, Agent, or Firm*—Walter C. Bernkopf

[57] ABSTRACT

A suspension arrangement for electric motor-driven traction vehicles wherein the electric motor is totally supported by resilient connections to a gear housing unit which is bearing-mounted to the axle and resiliently connected by a single mount to the vehicle truck frame. Torque is transmitted from the motor armature to the parallel axle through a gear train having rigid connection to the axle and flexible connection to the motor armature. Relative motions are thus permitted between the axle and the truck frame without imparting harmful shocks to the electric drive motor.

9 Claims, 5 Drawing Figures

TRACTION MOTOR HOUSING SUSPENSION

BACKGROUND OF THE INVENTION

This invention relates generally to traction vehicle propulsion systems and more particularly to a suspension arrangement for an electric drive vehicle propulsion unit.

Traction vehicle propulsion systems have historically been provided with a suspension system wherein the electric drive motor is mounted in such a manner as to allow for vibration of the axle without resulting shock transmission to the motor, thereby providing for greater dependability and reduced maintenance of the system. The wheel shocks are taken up by one or more resilient members in the drive and mounting linkages to the motor.

An early linkage design provided for a rigid connection between the motor and gears while the combination was resiliently connected to the frame and resiliently coupled to the axle through a rubber coupling element. This was less than satisfactory due to the critical nature of the resilient coupling. Assembly, maintenance, and durability were found to be a major source of difficulty.

An improved arrangement comprises a rigid axle-to-gear train coupling with a resilient connection between the motor and gear train assembly. Both the gear train assembly and the motor are then suspended from the vehicle truck frame either by a rigid or flexible coupling. Alternatively, an axle hung motor as contrasted from a frame hung motor is used in some designs.

However, the difficulties encountered in drive system suspension arrangements are intensified by additional demands placed thereon by the industry. Space, speed, maintenance and comfort considerations are some of the factors which call for new design requirements. Generally stated, the problem is to deliver motive power to an axle and to provide for multi-directional relative movement of the axle with respect to the mounted truck while protecting the driving motor from shocks and vibrations occurring to either the axle or the truck.

It is therefore an object of this invention to provide an improved suspension system for traction vehicle propulsion equipment.

Another object of this invention is the provision in a propulsion system for three degrees of relative motion between the axle and the truck frame mounted thereon.

Yet another object of this invention is the provision for a rigid coupling between the axle and its associated gear train for the transmission of motive power therebetween.

Still another object of this invention is the provision for a flexible coupling between the gear train and the driving motor to allow for slight misalignments therebetween and for motor torque reactions.

Yet another object of this invention is the provision for isolating the motor from shocks and vibrations occurring to the axle and the truck frame, so as to reduce maintenance and prolong life.

A further object of this invention is the provision for supporting a motor in a parallel drive arrangement.

Still another object of this invention is the provision for a propulsion system suspension arrangement which is economical to manufacture, durable in use, and effective in meeting required performance characteristics.

SUMMARY OF THE INVENTION

This invention discloses a parallel drive suspension system wherein an electric drive motor is totally supported by resilient connection to a gear train housing assembly. The motor armature is flexibly connected to the gear train to allow for slight misalignment therebetween while the gear train output element is coupled by a solid friction fit to the vehicle axle for rotation thereof. The gear train housing is rotatably mounted by bearings to the axle for direct support thereof, and has a single resilient linkage to the vehicle truck frame to take the torque reaction thereof.

Support elements of the motor include a pair of resilient mounts for vertical support, disposed respectively fore and aft of the motor on a line passing through the center of mass thereof, and a third resilient mount disposed in diametric opposition to one of the pair to provide axial stability. A plurality of resilient mounts are disposed at the drive end of the motor to take the torque reaction of the motor. The motor is thus isolated from shocks and vibrations transmitted by the vehicle wheels. The single resilient linkage to the truck frame permits 3 degrees of axle motion relative thereto.

These objects and other features and advantages become more readily apparent upon reference to the following description when taken in conjunction with the appended drawings.

In the drawings as hereinafter described, a preferred embodiment is depicted; however, various other modifications can be made thereto without departing from the true spirit and scope of the invention.

DESCRIPTION OF THE PREFERRED EMBODIMENT

Figure 1:
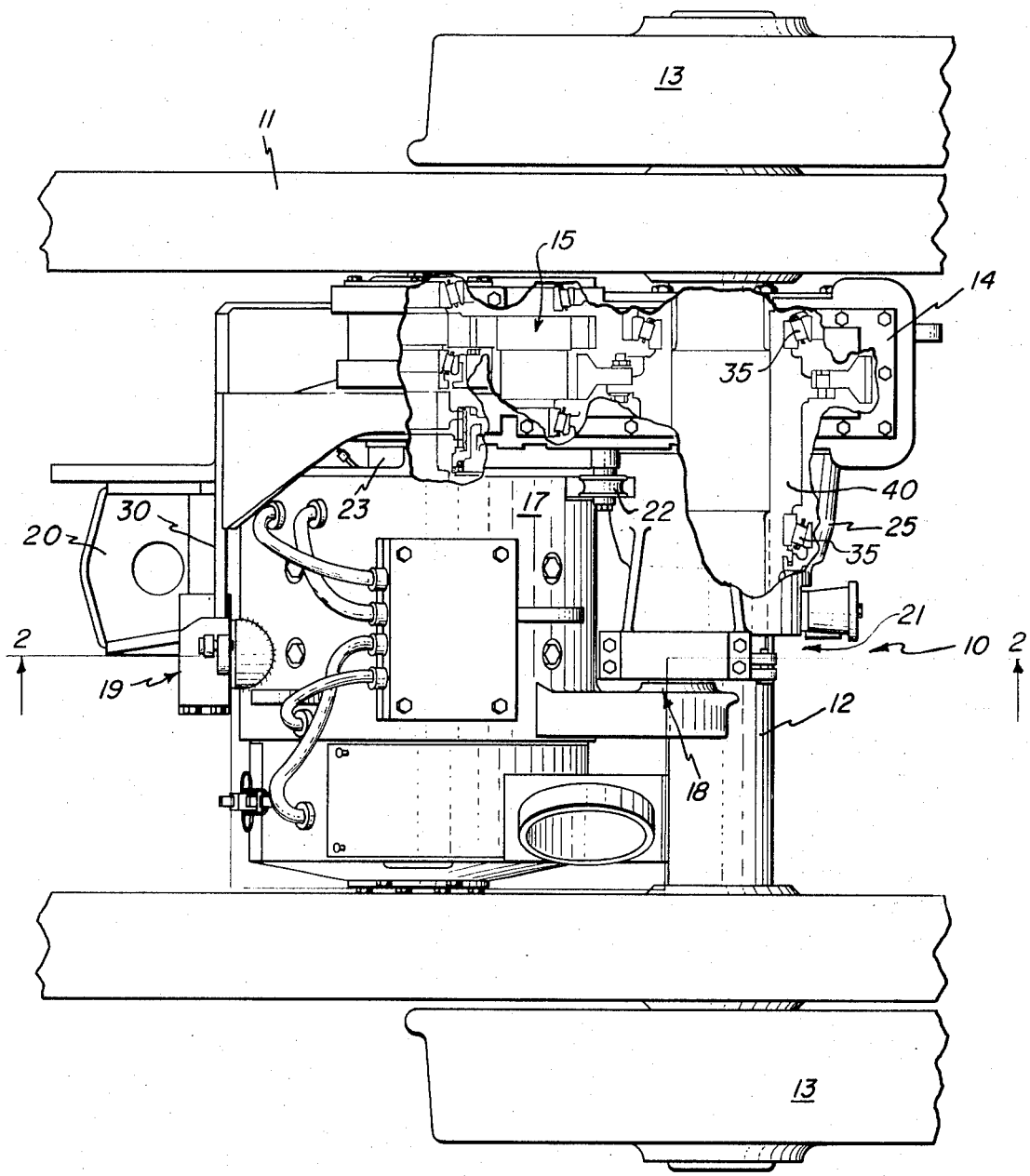
FIG. 1 shows a top plan view of the suspension system in accordance with the preferred embodiment of the invention.
Figure 2:
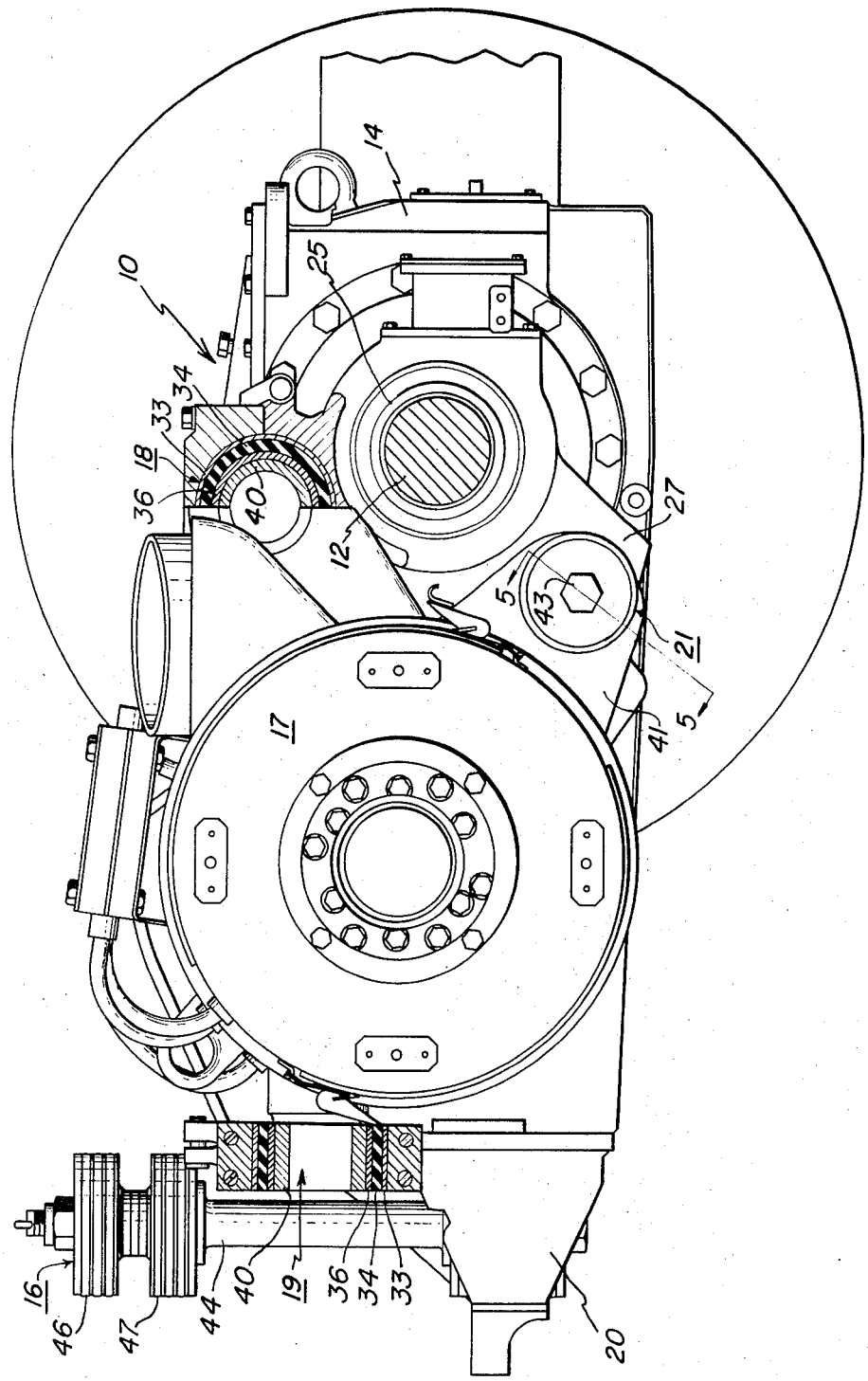
FIG. 2 is a side view thereof as seen along line 2—2 of FIG. 1.

Reference is now made to FIGS. 1 and 2 wherein the suspension arrangement is shown generally at 10 in combination with a conventional rail vehicle truck 11 such as that used on transit cars and the like. The truck is journaled and spring mounted on an axle 12 having a pair of rail engaging wheel 13. Journaled to the axle by bearings 36 is a housing assembly 14 containing a gear train 15 (FIG. 1) mechanically connected to the axle 12 by a quill 40 for rotation thereof, the housing being secured to the truck frame 11 by a resilient connection member 16 between the flange 20 on the housing assembly and the truck frame 11. Suspended from and totally supported by the housing assembly 14 is an electric drive motor 17 connected by resilient members comprising first and second motor mounts 18 and 19 respectively, a third motor mount 21, FIG. 2, and a plurality of motor-end mounts 22. A flexible drive coupling 23 mechanically connects the motor armature to the gear train for transmission of motive effort thereto.

The motor 17 is disposed in a parallel drive relationship with the axle 12, and is isolated from the transmission of wheel shock thereto by the aforementioned resilient motor mount combination. Such wheel shock is, however, transmitted to the axle and in turn to the gear housing assembly 14 by the solid connections therebetween. The conventional gear train 15 typically having helical gears, is solidly coupled to the axle 12 by a known means such as through a quill shaft press fit to the axle and main gear as shown in U.S. Pat. No. 3,468,389 issued to J. A. Nelson on Sept. 29, 1969 and assigned to the assignee of the present application. For purposes of this description the drive train can be thought of as a single stage reduction unit wherein the main gear meshes directly with a pinion gear adapted to be driven by the traction motor. However, it should be understood that other drive gear combinations may be utilized.

Figure 3:
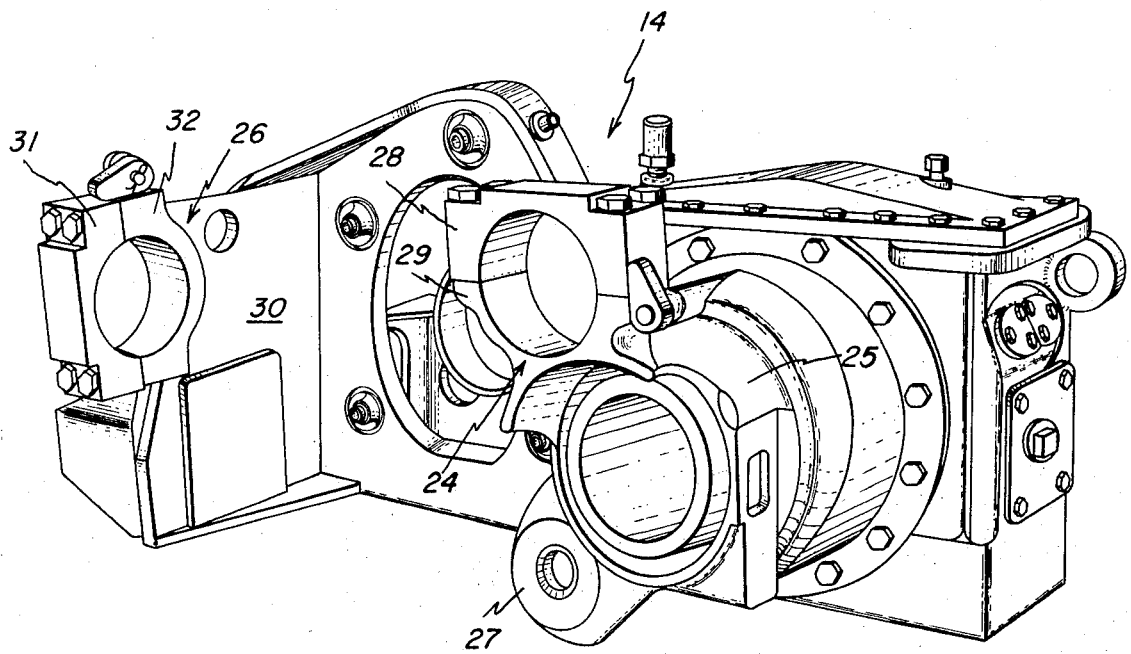
FIG. 3 is a perspective view of the gear train housing assembly.
Figure 4:
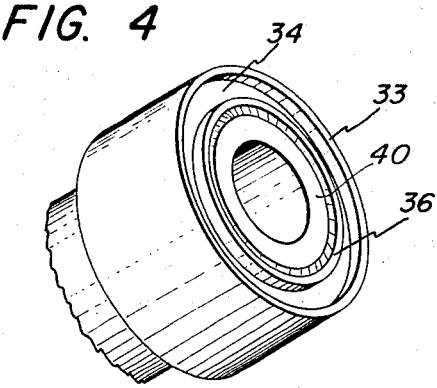
FIG. 4 is a perspective view of a resilient bearing portion of a motor mount used in the invention.

Support of the gear housing assembly 14 is provided at the axle by a direct journal connection thereto as is commonly done in the art, as for example, by roller bearings 39. However, as can be seen in FIG. 3, the housing assembly 14 uniquely includes as an integral part of its structure lugs 24, 26 and 27 which form a part of motor mounts 18, 19 and 21, respectively. Lug 24, which extends from a hub 25 around the axle 12 and comprises opposing bearing caps 28 and 29, is similar in nature to lug 26 which forms an integral part of a housing transverse element 30 and comprises opposing bearing caps 31 and 32. Each is adapted to receive therein, in a close fit relationship, a resilient bearing of the type shown in FIGS. 2 and 4 comprising in combination a bearing housing 33, an elastomeric cylinder 34 and a cylindrical core 36 press fitted on number 40.

Figure 5:
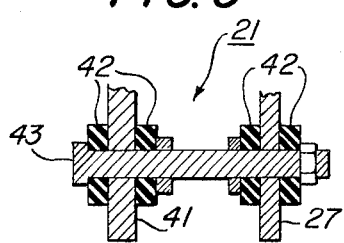
FIG. 5 is a sectional view as seen along lines 5—5 of FIG. 1.

Lug 27 also extends from the hub 25 and is coupled in axial alingnment with a similar lug 41 projecting from the motor to form the third resilient motor mount 21 (FIG. 5), resilient connection being made in a conventional manner as by elastomeric bushings projecting from the motor frame 42 and included bolt 43 extending through the lugs.

Principal support for the traction motor 17 is provided by the aforesaid first and second motor mounts 18 and 19, with both providing for vertical support thereof. Lateral support is provided by the second and third mounts 19 and 21, respectively. The first and second mounts 18 and 19 are located on a fore-and-aft or longitudinal (in the direction of vehicle travel) line passing through the center of mass of the motor, and are of the type having stiff radial support and soft axial support. The first mount 18 has its axis in a transverse direction to provide fore-and-aft support, while the second mount 19 has a fore-and-aft axis and provides lateral support for the motor.

The third motor mount 21 is disposed adjacent the axle 12 in substantially diametric opposition to the second motor mount 19. Its transverse placement with respect to the first mount 18 is not critical but is preferably near to being in the same vertical plane, that shown being slightly offset therefrom, toward the gear housing. A transverse axial disposition of the mount provides for lateral support of the motor and ensures a positive axial disposition thereof.

Although, in this parallel drive arrangement the motor axis remains substantially parallel to the axle, as mentioned hereinbefore, flexible coupling 23, as for example one of the flexible gear tooth type, must be provided between the motor armature and gear train 15 to allow for slight deviations in axial and radial alignment. Similarly, the frame of the motor 17 is attached to the housing assembly 14 by a plurality of circumferentially spaced resilient motor end mounts 22 having stiffness in the radial direction to take the torque reaction of the motor but flexibility in the axial direction to permit slight relative movement between the motor and housing assembly and thereby isolate the former from vibrations of the latter. Construction of the motor end mounts 22 may take on a variety of forms one being that described in U.S. Pat. No. 3,468,389 referenced hereinbefore.

Alternatively, any other suitable resilient mounting means may be employed between the motor and housing, such as for example, a continuous resilient member in place of the plurality of circumferentially spaced members.

Connection of the housing assembly to the truck frame is made by the single resilient linkage 16 comprising a rigid link 44 and resilient members 46 and 47 which attaches to the truck frame 11. Its axis is vertical so as to provide a good deal of vertical flexibility and limited horizontal flexibility to accommodate vertical and lateral motions of the axle. Further, the single link feature easily accommodates any axle tipping motions relative to the truck frame. Three degrees of freedom are thus provided between the axle and the truck frame to accommodate variations in the roadbed, with the motor being isolated from vibrations and shock occurring in either element.

What I claim as new and desire to secure by Letters Patent of the United States is:

1. An improved suspension arrangement for traction vehicles of the type having a truck frame, a plurality of wheel mounted axles attached thereto and a motor drivably connected through a housed gear train to at least one of the axles in a parallel drive relationship wherein the improvement comprises:
   a. a rigid drive connection from the gear train to the axle for transmitting torque thereto;
   b. bearings for rotatably supporting the gear train housing on the axle;
   c. a flexible coupling between the motor drive shaft and the gear train so as to provide for slight misalignments therebetween;
   d. a resilient mounting means providing spaced connections between the motor frame and the gear train housing which totally supports the motor and permits relative movement therebetween; and
   e. a single resilient connection between the gear train housing and the truck frame to provide positive placement of the housing against torque reaction movement; wherein relative vertical, longitudinal, and transverse movement between the axle and truck frame is facilitated, and the motor is totally supported by resilient mounts so as to be isolated from vibration and shock from the wheels.

2. A suspension arrangement as set forth in claim 1 wherein said mounting means includes at least one resilient motor end mount resiliently connecting the drive end of the motor to the gear housing for support and for taking the torque reaction thereof.

3. A suspension arrangement as set forth in claim 1 wherein said mounting means includes first and second resilient mounts aligned substantially on a longitudinal line passing through the center of the mass of the motor, said first mount being adjacent the axle and having its axis in a transverse direction, and said second mount having a longitudinal axis, said first and second mount having stiff radial support and soft axial support.

4. A suspension arrangement as set forth in claim 3 wherein said first and second mounts each comprise a bearing and associated bearing caps said bearings each comprising a cylindrical core attached to and extending from the motor, an elastomeric cylinder disposed thereover in close fit relationship, and a cylindrical bearing housing disposed in close fit relationship around said elastomeric cylinder.

5. A suspension arrangement as set forth in claim 4 and including a third resilient motor mount disposed adjacent the axle in substantially diametric opposition to said second motor mount, its axis being disposed transversely and providing positive axial support.

6. A suspension arrangement as set forth in claim 5 wherein said third resilient motor mount comprises a pair of transversely spaced fore-and-aft disposed flanges, an elastomeric member sandwiched therebetween, and securing means for maintaining axial alignment of the combination in close fit relationship.

7. A suspension arrangement as set forth in claim 1 wherein said single resilient connection between the gear train housing and the truck frame has a vertical axis and provides vertical support for the housing.

8. A suspension arrangement as set forth in claim 7 wherein said single resilient connection comprises a pair of horizontal flanges, an elastomeric member sandwiched therebetween, and securing means for maintaining axial alignment of the combination in close fit relationship.

9. A suspension arrangement as set forth in claim 1 wherein said flexible coupling is disposed in axial alignment with the motor.

* * * * *